United States Patent [19]
Kostick

[11] 3,779,657
[45] Dec. 18, 1973

[54] STRUCTURAL JOINT
[75] Inventor: John M. Kostick, Roxbury, Mass.
[73] Assignee: Omniversal Design, Roxbury, Mass.
[22] Filed: Apr. 21, 1971
[21] Appl. No.: 135,839

[52] U.S. Cl. ............................................403/217
[51] Int. Cl. .............................................. F16b 7/18
[58] Field of Search .......... 287/189.36 R, 189.36 C,
287/54 B, 189.36 F; 52/646, 648, 651, 652,
665, 695, 719

[56] References Cited
UNITED STATES PATENTS

| | | | |
|---|---|---|---|
| 729,784 | 6/1903 | Myers | 40/152 |
| 2,865,589 | 12/1958 | D'Azzo | 287/189.36 C X |
| 891,929 | 6/1908 | Graham | 52/651 |
| 2,074,320 | 3/1937 | Bauer | 52/651 |
| 1,709,379 | 4/1929 | Tappan | 287/189.36 C |
| 2,389,899 | 11/1945 | Deddo | 287/189.36 C |
| 3,349,527 | 10/1967 | Bruns | 52/648 X |
| 3,387,868 | 6/1968 | Borden | 287/51 |

FOREIGN PATENTS OR APPLICATIONS

| | | | |
|---|---|---|---|
| R10,831 | 9/1955 | Germany | 287/54 B |
| 485,579 | | Italy | 287/54 B |
| 86,519 | 9/1920 | Switzerland | 287/189.36 C |

Primary Examiner—James R. Boler
Assistant Examiner—Wayne L. Shedd
Attorney—Martin Kirkpatrick

[57] ABSTRACT

A structural joint comprising three pairs of beams, the beams of each pair being spaced from and parallel to one another, the beams of any pair lying exterior to the beams of a second included pair and lying interior to the beams of a third pair, the included widths of the beams of a pair being equal. The three pairs of beams together define an intersection void; a tension member passes through the intersection void and joins the two beams of a pair and biases them together against the included second pair. The tension members extending between the beams of each pair are aligned in a different plane in relationship to those of the other pairs.

7 Claims, 3 Drawing Figures

3,779,657

STRUCTURAL JOINT

This invention relates to structural joints.

In building construction, it is desirable to have a means for joining structural beams aligned in different planes in a rigid and stable relationship. Such a joint is needed, for example, at corners, or in joining transverse to longitudinal members in frameworks. In the building of modular structures, using numbers of similar basic modules to make more complicated structures, a strong and simple joint is needed for connecting the repeated elements, to form, for example, temporary structures, partially prefabricated buildings, domes, spheres and the like. Such a joint should be rigid, strong, and simple to put together. In addition, some of the elements connected by the joint may desirably provide the capability of supporting panels such as wall panels, which may be removed or added as desired.

It is an object of the invention to provide a three-way joint that joins beams in rigid and stable relationship. It is a further object to provide such a joint that can be assembled easily and only in the correct relationship of the parts. It is another object to provide such a joint that is self-aligning. Finally, it is an object to provide such a joint that is reliable in use and inexpensive to make.

The invention provides a structural joint comprising three pairs of beams, the beams of each pair being spaced from and parallel to one another. The beams of any one pair lie exterior to the beams of a second included pair, and interior to the beams of a third pair, and all three pairs of beams together define an intersection void. A tension member joins the two beams of each pair and biases them together against a second included pair. The tension member passes through the intersection void; the tension members extending between the beams of each pair are in skewed relationship to those of the other pairs, that is, the tension members of each pair are aligned in a different plane from the planes of the tension members of the other pairs, so that they are non-coplanar, non-parallel and non-intersecting.

In preferred embodiments, the beams have a U-shaped cross section, providing two generally flat sides including between them a generally flat base at right angles to the sides, the bases of the two beams of any pair being of equal width. The beam pairs are joined at right angles to one another. A pair of spaced threaded rods joins the two beams of each pair, biasing the bases together against the sides of a second included beam pair and passing through the intersection void. The bases of a beam pair provide cooperative tension member positioning means in the form of holes through which the threaded rods pass, positioning each rod tangential to and in contact with a base of the included beam pair for self-alignment of the joint.

Other objects, features and advantages will appear from the following description of a preferred embodiment of the invention, taken together with the attached drawings thereof, wherein.

Figure 1:
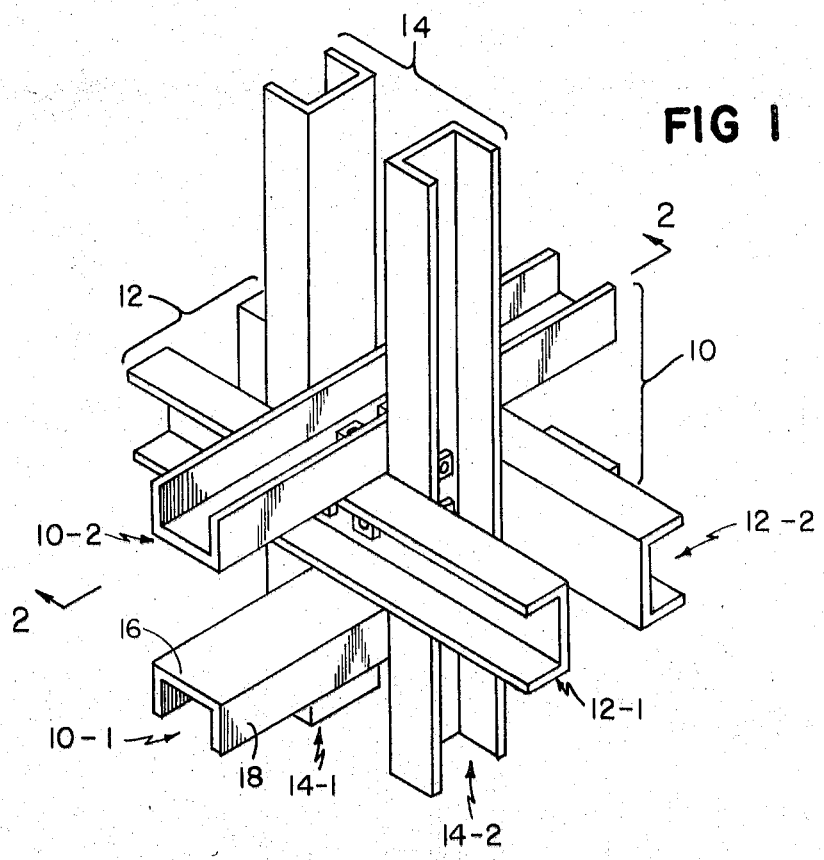
FIG. 1 is a general view of a preferred embodiment of the structural joint of the present invention.
Figure 2:
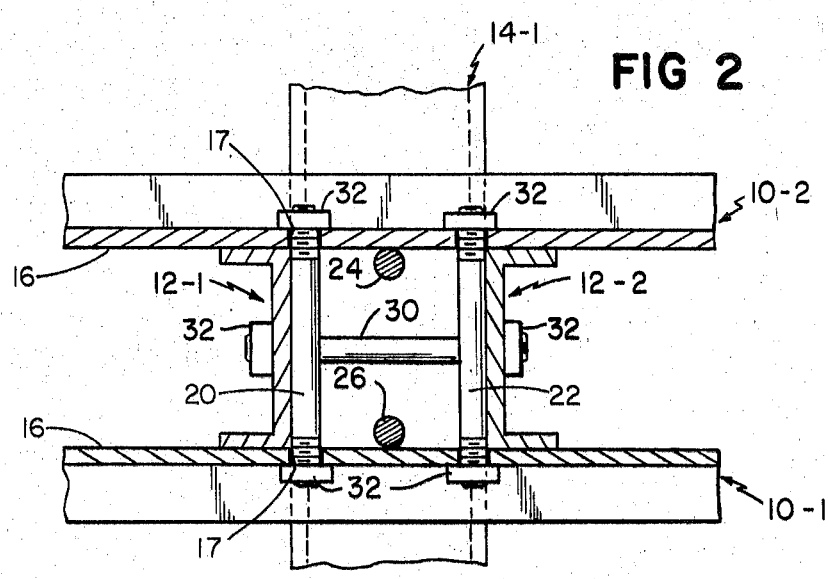
FIG. 2 is a section along line 2—2 of FIG. 1.

Referring now to the drawings, and particularly to FIG. 1, three beam pairs 10, 12 and 14 are joined by the structural joint of the invention. In the particular embodiment shown in the drawings, the beams are joined at right angles to one another. Beam pair 10 comprises beam 10-1 and 10-2, beam pair 12 comprises beams 12-1 and 12-2, and beam pair 14 comprises beams 14-1 and 14-2, as shown. Each beam, as for example beam 10-1, has a generally flat base 16 included between two generally flat sides 18 which form right angles with base 16. Thus each beam in the embodiment here described has a U-shaped cross section and forms a channel, opening outwardly of the joint. Such a channel might be used, for example, to receive the edge of a panel supported by the beam.

Each beam pair, for example pair 12, lies interior to another beam pair, as pair 14, and exterior to a third (included) beam pair, pair 10. Similarly pair 10 lies exterior to pair 14 and interior to pair 12, while pair 14 lies exterior to pair 12 and interior to pair 10. This arrangement of beams contributes to the rigidity and stability of the final joint, as each beam pair compresses another pair while being itself compressed by a third pair. Because of the symmetry of the joint, all forces pass through the center of the joint, and therefore there are no torques on the beams, thus providing a momentless joint for the beams.

Figure 3:
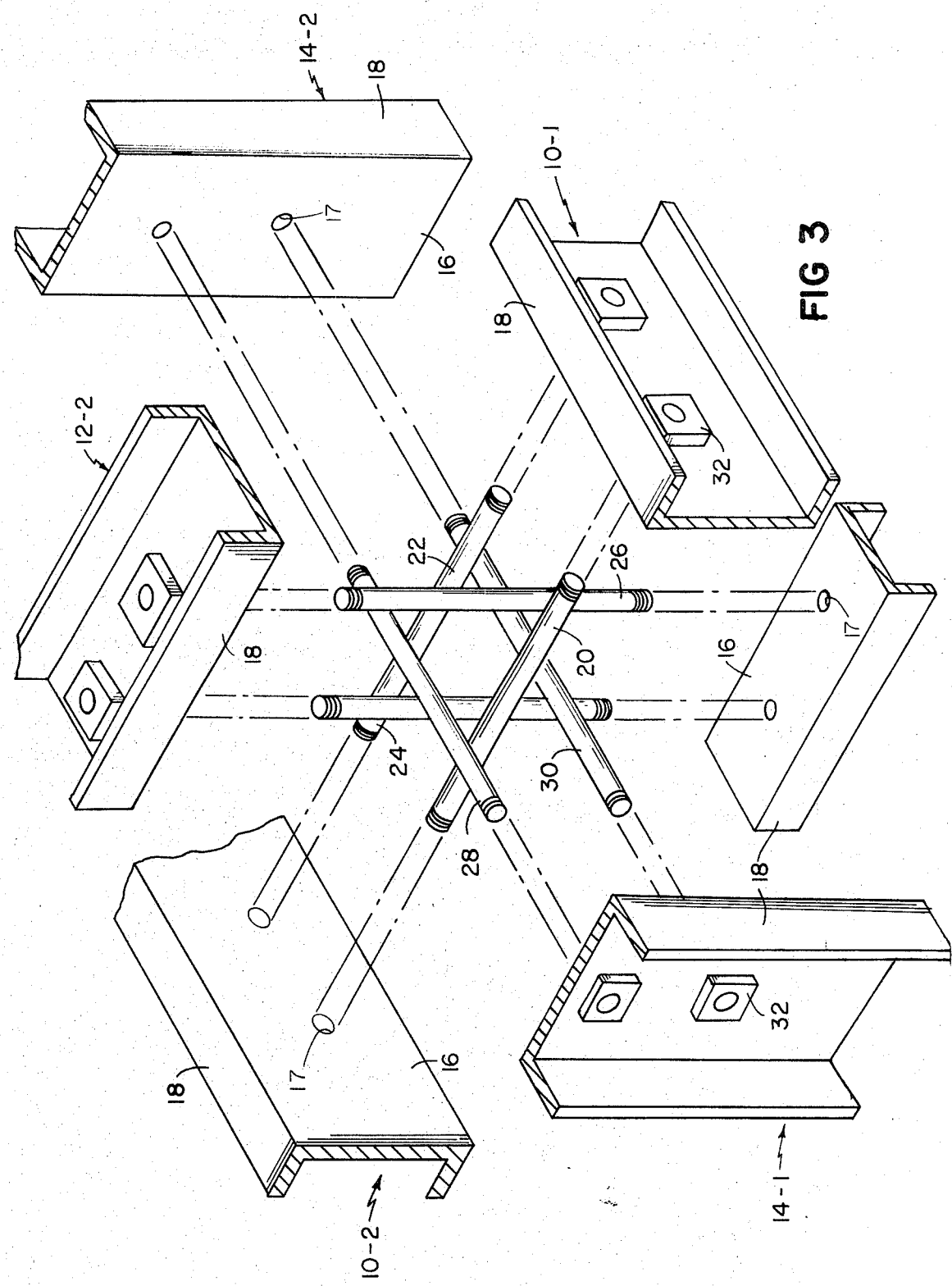
FIG. 3 is an exploded view of a portion of the joint showing the relative positions of the tension members.

Referring now particularly to FIG. 3, the beams of each pair are joined by tension members, which may be, for instance, threaded rods secured by nuts.

Beams 10-1 and 10-2 are joined by tension members 20 and 22, beams 12-1 and 12-2 are joined by tension members 24 and 26, and tension members 28 and 30 join beams 14-1 and 14-2. The tension members pass through guide holes 17 in faces 16 of the beams and are secured by nuts 32.

Referring now particularly to FIG. 3, the guide holes 17 in faces 16 of beam pair 12 are so located as to position tension member 24 tangential to and in contact with base 16 of included beam 10-2, and to position tension member 26 tangential to and in contact with base 16 of included beam 10-1. Similarly, the remaining tension members are positioned by the guide holes 17 to pass tangential to and in contact with bases 16 of the included beam pair in each case. This positioning of the tension members by the guide means has the result that the structural joint of the invention is self-aligning, and can be assembled in only one way, that is, the correct way.

When the joint is assembled, tension members 24 and 26 join beams 12-1 and 12-2 and bias them together, compressing their bases 16 against sides 18 of included beam pair 10. At the same time, tension members 20 and 22 join beams 10-1 and 10-2, biasing them together and compressing their bases 16 against sides 18 of included beam pair 14; and tension members 28 and 30 bias beams 14-1 and 14-2 together, compressing included beam pair 12. Thus each beam pair is simultaneously compressed by another pair while it compresses a third, providing an extremely stable and rigid joint.

While the particular embodiment shown in the drawings provides U-shaped beams joined at right angles to one another, the joint of the invention is equally useful for joining simple rectangular beams. Additionally, two or all of the beams may be joined at angles other than 90°, if desired for a particular application, as for example in forming a roof.

What is claimed is:

1. A structural joint comprising three pairs of beams, each said beam having uniform cross-section at said joint and extending therebeyond, the beams of each said pair being spaced from and parallel to one another,
said beams of said pair lying exterior to the beams of a second included said pair and lying interior to the beams of a third said pair, the included widths of the beams of a pair being equal,
said three pairs of beams together defining an intersection void, three independent tension members,
a tension member joining said two beams of each said pair and biasing said two beams together against a second included said pair, and passing through said intersection void, said tension member extending between the beams of each pair being aligned in a different plane relationship to those of the other pairs.

2. The structural joint of claim 1, wherein each said beam provides a base and two sides, said two beam bases of any pair being of equal width, said bases of said three beam pairs together defining said inersection void, and said tension member biases said bases of said two beams together against said sides of a second included said pair of beams.

3. The structural joint of claim 1, wherein
a pair of spaced tension members joins the beams of a said pair.

4. The structural joint of claim 3, wherein
said beam bases include tension member guide means positioning one said tension member tangential to and in contact with each said base of said included pair of beams.

5. A structural joint comprising three pairs of spaced parallel beams,
each said beam providing two generally flat sides including between them a generally flat base at right angles to said sides, said two beam bases of any pair being of equal width,
said beams of any said pair lying exterior to the beams of a second included said pair and lying interior to the beams of a third said pair,
said bases of said three beam pairs together defining an intersection void,
a pair of spaced tension members joining said two beams of each said pair and biasing said beam bases together against said sides of said second included beam pair and passing through said intersection void,
said tension members extending between the beams of each pair being aligned in a different plane in relationship to those of the other pairs.

6. The structural joint of claim 5 wherein
said bases of said beam pair provide cooperative tension member guide means positioning one said tension member tangential to and in contact with each said base of said second included beam pair.

7. The structural joint of claim 5 wherein
each said beam pair forms a right angle with each other said beam pair.

* * * * *